(12) United States Patent
Ziegler

(10) Patent No.: US 8,879,571 B2
(45) Date of Patent: Nov. 4, 2014

(54) DELAYS BASED ON PACKET SIZES

(75) Inventor: Michael L. Ziegler, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 13/286,878

(22) Filed: Nov. 1, 2011

(65) Prior Publication Data
US 2013/0111050 A1   May 2, 2013

(51) Int. Cl.
*G06F 15/16* (2006.01)
*H04L 12/46* (2006.01)
*H04L 12/931* (2013.01)

(52) U.S. Cl.
CPC .......... *H04L 12/4633* (2013.01); *H04L 49/505* (2013.01)
USPC .......... 370/429; 370/235; 370/389; 370/412; 370/413

(58) Field of Classification Search
CPC . H04L 49/30; H04L 49/3018; H04L 49/3027; H04L 49/90; H04L 47/52
USPC ................ 370/412–419, 429, 229, 231, 235, 370/386–388, 395.6–395.7, 537–538
See application file for complete search history.

(56) References Cited

U.S. PATENT DOCUMENTS

| | | | |
|---|---|---|---|
| 6,052,368 A * | 4/2000 | Aybay | 370/357 |
| 6,888,848 B2 * | 5/2005 | Beshai et al. | 370/474 |
| 7,024,505 B2 | 4/2006 | Thiesfeld | |
| 7,353,286 B2 | 4/2008 | Brown et al. | |
| 7,526,593 B2 * | 4/2009 | Mandal et al. | 710/310 |
| 7,593,329 B2 | 9/2009 | Kwan et al. | |
| 7,616,570 B2 * | 11/2009 | Ronneke et al. | 370/235 |
| 8,223,641 B2 * | 7/2012 | Lee et al. | 370/234 |
| 2001/0033581 A1 * | 10/2001 | Kawarai et al. | 370/468 |
| 2002/0071387 A1 * | 6/2002 | Horiguchi et al. | 370/229 |
| 2002/0110086 A1 * | 8/2002 | Reches | 370/235 |
| 2004/0131063 A1 * | 7/2004 | Yamamoto et al. | 370/395.7 |
| 2004/0184449 A1 * | 9/2004 | Sreejith et al. | 370/367 |
| 2004/0190466 A1 * | 9/2004 | Jones et al. | 370/299 |
| 2007/0019650 A1 * | 1/2007 | Nielsen | 370/395.4 |
| 2008/0114894 A1 * | 5/2008 | Deshpande | 709/237 |
| 2010/0121972 A1 | 5/2010 | Samuels et al. | |

OTHER PUBLICATIONS

Wang, X. et al., "Dynamic Duty Cycle Control for End-to-end Delay Guarantees in Wireless Sensor Networks", http://web.eecs.utk.edu/~xwang/papers/iwqos10_dutycon.pdf.

Zhang, Q. et al., Sender-adaptive and Receiver-driven Layered Multicast for Scalable Video Over the Internet, http://v-scheiner.brunel.ac.uk/bitstream/2438/2545/1/Sender-adapt.

* cited by examiner

*Primary Examiner* — Hassan Kizou
*Assistant Examiner* — Amy Ling

(57) ABSTRACT

Techniques for delays based on packet sizes are provided. Request messages may identify the size of a data packet. Delays may be initiated based in part on a portion of the size of the data packet. The delays may also be based in part on target issue intervals. Request messages may be sent after the delays.

17 Claims, 12 Drawing Sheets

| TARGET ISSUE INTERVAL (410) | DELAY PER 64 BYTES (420) | EFFECTIVE BANDWIDTH (430) | |
|---|---|---|---|
| 0 | 4 ns | 128 Gbit/sec | ★ ← 470 |
| 1 | 8 ns | 64 Gbit/sec | |
| 2 | 16 ns | 32 Gbit/sec | |
| 3 | 32 ns | 16 Gbit/sec | ★★ ← 460 |
| 4 | 64 ns | 8 Gbit/sec | |
| 5 | 128 ns | 4 Gbit/sec | |
| 6 | 256 ns | 2 Gbit/sec | ★★★ ← 450 |
| 7 | 512 ns | 1 Gbit/sec | |
| 8 | 1024 ns | 500 Mbit/sec | |
| 9 | 2048 ns | 250 Mbit/sec | |
| 10 | 4096 ns | 125 Mbit/sec | |
| 11 | 8192 ns | 62.5 Mbit/sec | |
| 12 | 16384 ns | 31.25 Mbit/sec | |
| 13 | 32768 ns | 15.63 Mbit/sec | |
| 14 | 65536 ns | 7.81 Mbit/sec | |
| 15 | 131072 ns | 3.9 Mbit/sec | |

440

★    BASE 100G PORT

★★   BASE 10G PORT

★★★  BASE 1G PORT

FIG. 4

DELAYS BASED ON PACKET SIZES

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may then forward the data packet to another port for output to either the desired destination or to another network device for further forwarding toward the destination. The bandwidth available in a network device for such data transfer may be finite, and as such it would be desirable to make such transfers as efficient as possible.

BRIEF DESCRIPTION OF THE DRAWINGS

FIG. 4 depicts an example of Target Issue Intervals.

DETAILED DESCRIPTION

Figure 1:
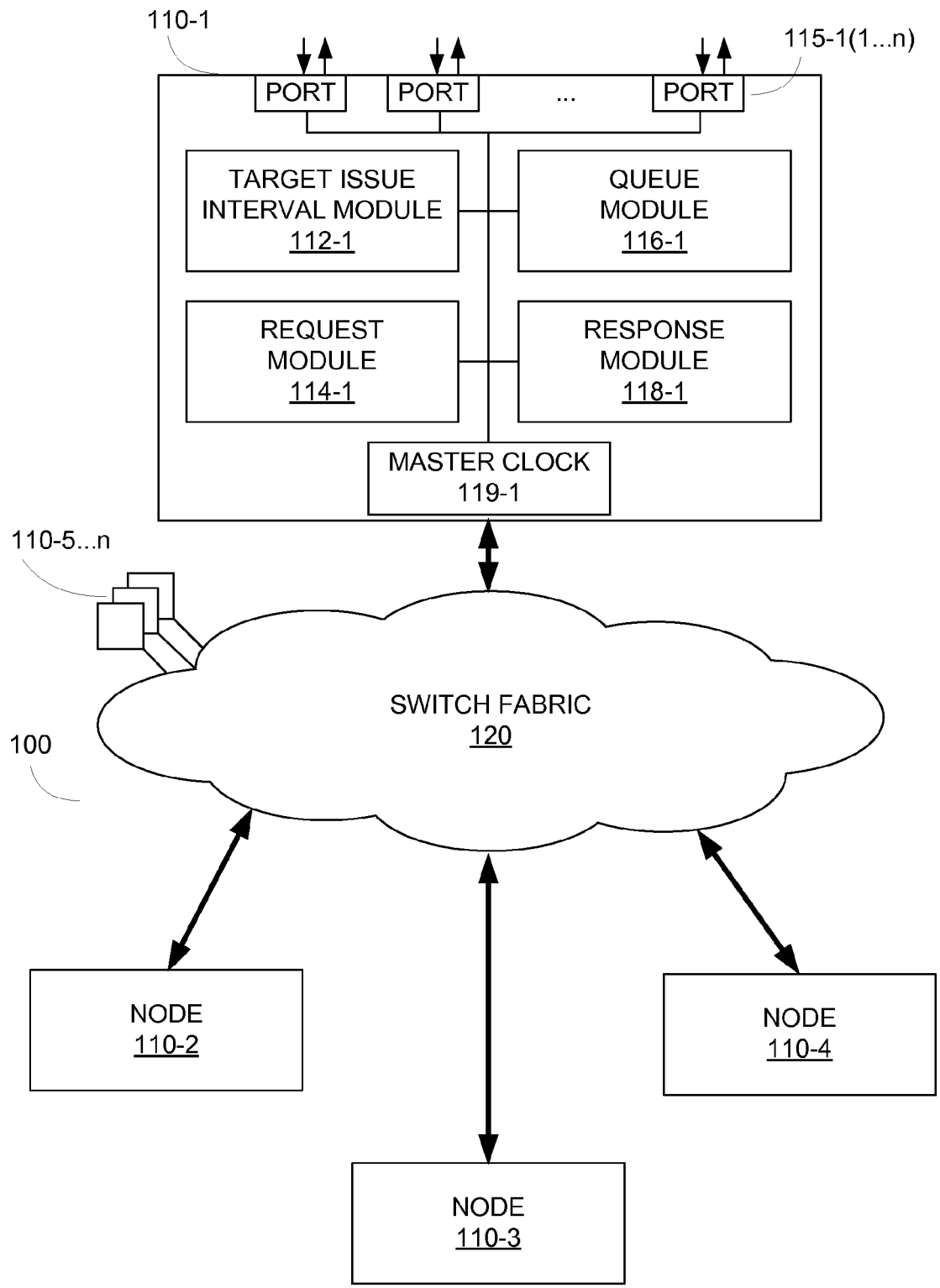
FIG. 1 is a high level block diagram of an example of a network device.

A network device may receive data packets from a plurality of sources and will route those data packets to the desired destination. The network device may receive the data packets through ports that are connected to external packet sources. The network device may then route those data packets to other ports on the network device through a switch fabric. The switch fabric allows for packets to be sent from one port on the network device to a different port. The network device may then output the data packet on a different port.

Each port may operate at a certain data rate. For example, a port may operate at 1 Gbit/sec, 10 Gbit/sec, or 100 Gbit/sec. The data rate at which a port operates determines how fast the port may receive and/or transmit data. Thus, a port with a data rate of 10 Gbit/sec may output data at that rate or below. Data packets may be received from an external source through a port on a source node. The data packets may be organized into streams. For purposes of this description, a stream is a set of data packets that may all be going to the same output port on a destination node. However, it should be understood that each source node may have multiple streams destined for different ports on the same or different destination nodes. Furthermore, a source node may have multiple streams that are destined for the same output port on a destination node. For example, the streams may serve different classes of data packets.

Data packets may be sent to an output port at a rate that exceeds the rate at which data may be output from the port. For example, if an output port operates at 10 Gbit/sec and two streams are sending data to that output port at 10 Gbit/sec each, the combined rate of data coming in is 20 Gbit/sec. This rate of input exceeds the rate at which data can be output from the port, thus resulting in a backup at the output port. Each output port may maintain an output queue in which data may be buffered while waiting to be transmitted from the port. However, the buffer size may be finite and if the input rate exceeds the output rate for a long enough period of time, the buffer may become full.

Discrepancies in the incoming and outgoing data rate may be mitigated by controlling the rate at which streams send data to an output port. A source node may send request messages which identify a size of a data packet to be sent to a port on a destination node. Based on the impact to the output buffer of adding a packet of the identified size, the destination node may determine a Target Issue Interval (TII) which may be used to determine the rate at which a stream should offer data packets for addition to the buffer. As the output buffer, also referred to as an output queue, begins to fill, the TII value may be modified such that the streams offer less data. Conversely, as the output queue drains, the TII value may be modified such that the streams offer greater amounts of data. Furthermore, the amount of data offered by a stream is normalized, such that each stream may be given an approximately equal share of the space available in the output queue.

A problem may arise in that the TII value may be changing. A source node may limit the flow of data packets based on the TII value currently in effect. However, the TII value may increase or decrease. Thus, the source node may send data at a rate that is either too fast or too slow based on the instant TII value. Techniques described herein overcome this problem by periodically checking the TII value while regulating the flow of data packets. Increases or decreases in the TII value may be recognized and corrective action taken to conform the rate of data packets to the rate desired by the output buffer.

FIG. 1 is a high level block diagram of an example of a network device. The network device 100, such as a switch or router, may implement the example techniques described herein in order to regulate the rate at which data is sent to an output port. The network device may include a plurality of nodes 110-1 . . . n. For purposes of clarity, only one node is shown in detail in FIG. 1; however it should be understood that there may be any number of nodes. Furthermore, all nodes are capable of both sending and receiving packets, and may be doing so simultaneously. However, for ease of description, FIG. 1 will be described, in terms of a destination node 110-1 which may receive data packets from other nodes, referred to as source nodes. The destination node may inform the source nodes of the rate at which data may be sent. The source nodes may respond by conforming the rate at which data is sent to the destination node to the specified rate. It should be understood that in operation, a node may act as both a source node and a destination node at the same time for different data packets or even for the same packet.

A node 110-1 may include a plurality of ports 115-1 (1 . . . *n*). Ports 115-1 may be used to connect to external sources of data packets, such as computers, servers, or even other network devices. The node 110-1 may receive data packets from these external sources through the ports. The node may also send data packets to external devices through the ports. The number of ports that exist on a node may be determined by the design of the network device. For example, in some modular switches, capacity may be added by inserting an additional line card containing 4, 8, 16, or 32 ports. The line card may also contain a node chip to control the data packets sent to and received from the ports. In some cases, depending on the number of ports included on a line card, more than one node chip may be required. However, for purposes of this explanation, a set of ports may be controlled by a single node chip.

The node chip, which may simply be referred to as a node, may typically be implemented in hardware. Due to the processing speed requirements needed in today's networking environment, the node may generally be implemented as an application specific integrated circuit (ASIC). The ASIC may contain memory, general purpose processors, and dedicated control logic. The various modules that are described below may be implemented using any combination of the memory, processors, and logic as needed.

The node 110-1 may include a Target Issue Interval (TII) module 112-1, a request module 114-1, a queue module 116-1, a response module 118-1, and a master clock module 119-1. The TII module may be used to maintain a TII value for every output port within the networking device. When a node is acting as a source node, the TII module may be used to determine the TII value currently in effect for an output port. The TII value may be used to determine the rate at which a stream may send data to that output port. Node 110-1 may also include a request module 114-1. The request module may be used by a source node to inform a destination node that a data packet is available to be transferred to the destination node. The request module may issue a request message which contains the size of the data packet that is being offered to an output port of a destination node. The request message does not transfer the actual data packet, but rather just informs the destination that a packet is available. At that point, if the destination chooses to accept the request, the data packet may be sent from the source node to the destination node. In some implementations, the source node may initiate sending the data packet, while in other implementations, the destination node initiates the transfer. The techniques described herein are applicable regardless of which node initiates the transfer of the data packet.

Node 110-1 may also include a queue module 116-1. The queue module may be used to establish output queues for each port contained on the node. For example, the queues may be implemented as First In First Out (FIFO) queues. As data packets are received by a destination node, the packets may be added to an output queue for eventual transmission out of the network device through one of the output ports. The queue module may also maintain a TII value for each output port on the node based on the depth of the output queue. Node 110-1 may also include a response module 118-1. The response module may be used to respond to request messages. The response module may receive a request message and first determine if the request message will be accepted. The response module may send a response indicating if the request message is accepted or refused. Also included in the response message may be an indication of the TII value for the output queue that was the target of the request message. The TII value may be received from the queue module. When a response message is received by a source node, the included TII value may be used to update the TII value stored in the TII module. In addition to responding to request messages, the response module may send a periodic update message to all other nodes that contains the TII values for some or all of the ports on the node. As will be explained in further detail below, the TII value may determine the rate at which a source node may issue request messages. Node 110-1 may also include a master clock module 119-1. The master clock module may be used to determine when a periodic update message is sent. Furthermore, the master clock module may be used to control the flow of request messages, as will be described in further detail below.

System 100 may also include a switch fabric 120. The switch fabric may receive messages from the nodes and route those messages to their intended destination. Each node may have one or more interfaces to the switch fabric, and it is through the switch fabric that the nodes may communicate with each other.

In operation, data packets may be received by a node, which will be referred to as a source node, for transmission to a destination node, for eventual output on a port of that destination node. A source node may receive packets from external sources through the ports. The source node may organize these packets into streams. For purposes of this description, a stream may be a set of packets that are all destined to be output on the same port of a destination node. However, it should be understood that all data packets from a given source node that are intended for the same output port of a destination node may not all be included in the same stream. A source node may have multiple streams that each contain packets that are to be output on the same port of a destination node. Furthermore, as mentioned above, there may be many source nodes, each containing their own streams. Thus, for a given output port on a destination node there may be streams of packets arriving from different source nodes. Furthermore, there may be multiple streams arriving from the same source node.

When a data packet is available to be sent to an output port of a destination node, the source node may send a request message. Included in the request message may be a size of the data packet. The source node may issue request messages at a rate determined by the TII, which may be retrieved from the TII module. The rate of issuance of request messages may determine the amount of data that is being sent from the stream to a port on the destination node, as will be described in further detail below.

Upon receipt of the request message, the destination node may determine the depth of an output queue that is associated with the output port that is the target of the request message should a data packet of the size identified in the request message be added to the output queue. Based on the determination of the resulting depth of the queue, the destination node may determine a TII value for the output port, and include this TII value in a response message returned to the source node that sent the request message. The destination node may also periodically send a periodic update message to all source nodes that includes the TII values for at least some of the ports on the destination node.

Upon receipt of the response message, the source node may update the TII module to reflect the TII value that was communicated in the response message. The source node may also update the TII values for a given destination node upon receipt of a periodic update message from that destination node. At some point after the receipt of the response message, the data packet may be sent from the source node to the destination node. As mentioned above, the transfer of the data packet may be initiated by either the source or the destination node and the techniques described herein are not dependent on which node initiates the data transfer. Once the data packet is received by the destination node, it may be added to an output queue associated with the output port to which the data packet is being sent.

Figure 2:
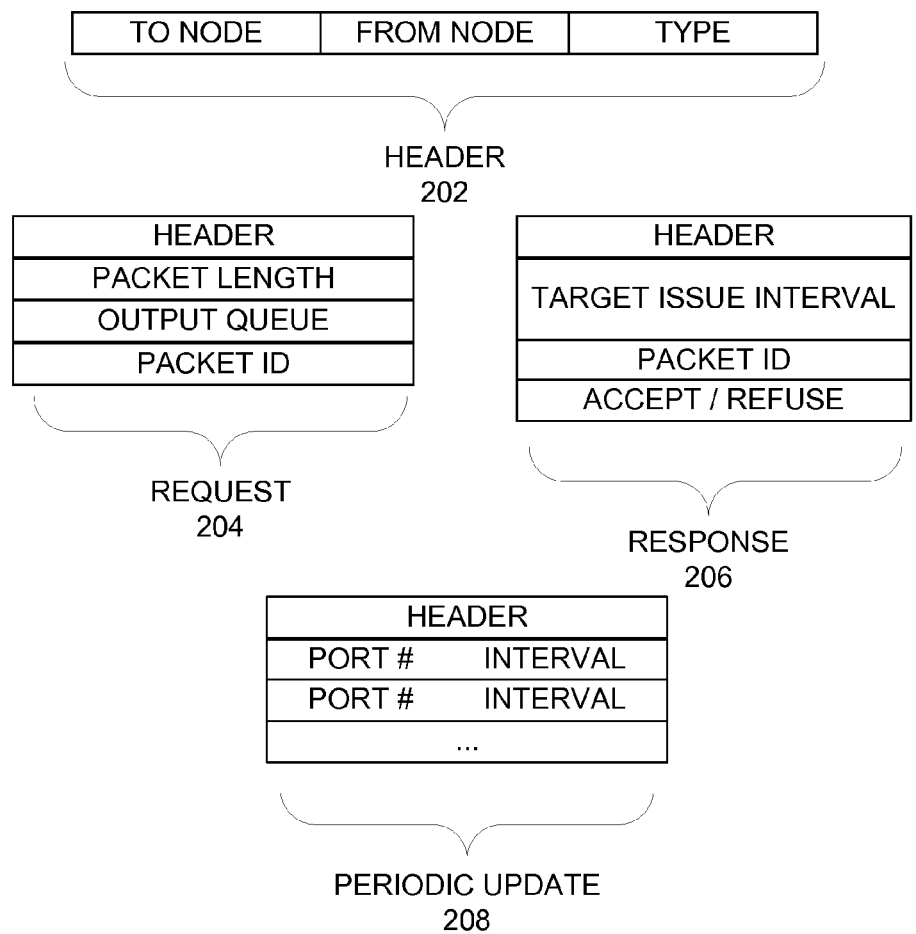
FIG. 2 depicts an example of message content and structure that may be used in an embodiment.

FIG. 2 depicts an example of message content and structure that may be used in an embodiment. The messages described in FIG. 2 are an example of those that may be used with the system as described in FIG. 1. In this example implementation, each message includes a header 202. The header may include a 'To Node' field which identifies the node that the message is intended for. Also included is a 'From Node' field which identifies the node that sent the message. The node identifications may be used by the switching fabric to properly transfer messages from the sending node to the intended recipient node. In addition, the header may also include a 'Type' field which is further used to identify the contents and structure of the message when received.

In the present example implementation there are three basic message types that are used to facilitate the transfer of data packets in a stream from the source node to the destination node. Each message type includes the header 202 which will not be described further. The first message type is the request message 204. The request message may be used by a source node to notify a destination node that a data packet is ready to be transferred from the source node to the destination node. The request message may include a Packet Length' field which includes the length of the data packet that is being offered. The request message may include an 'Output Queue' field. The 'Output Queue' field may be used to identify an output queue, which in turn determines an output port, on the destination node to which the data packet is to be added. The request message 204 may also include a 'Packet ID' field to identify the data packet. The use of the 'Packet ID' field will be described below.

The second message type is the response message 206. The response message may be used by a destination node to notify the source node that a request message has been received. The response message may include a 'Packet ID' field that identifies the data packet as described with respect to the request message. When the source node receives the response message, the 'Packet ID' field may be used to identify the data packet that is associated with the response. Identifying the data packet in turn identifies the output queue that has sent the response. In some example implementations, the output queue sending the response may be identified in the response message.

The response message may also include a 'Target Issue Interval' field. The 'Target Issue Interval' field may be used by the destination node to inform the source node of the rate of data transfer the output queue desires. The Target Issue Interval will be described in further detail below; however, for purposes of description, the TII identifies the rate at which the responding output queue is willing to accept data. The response message may also include an 'Accept/Refuse' field. The 'Accept/Refuse' field may be used by the destination node to inform the source node if the request message associated with a 'Packet ID' is being accepted or refused.

The third message type is the periodic update message 208. The periodic update message may be sent by the destination node to the source node, as the name implies, periodically. For example, the periodic update message may be sent every 5 microseconds. It should be understood that the periodic update message is sent autonomously by the destination node, and is not in response to any particular message. Included in the periodic update message may be a list of Target Issue Intervals (abbreviated as Interval in the figure). As mentioned above, a destination node may have multiple I/O ports, each of which is associated with an output queue. The periodic update message may contain the Target Issue Interval for one, some, or all I/O ports on the destination node that sent the message. Target Issue Intervals are described in further detail below.

Figure 3:
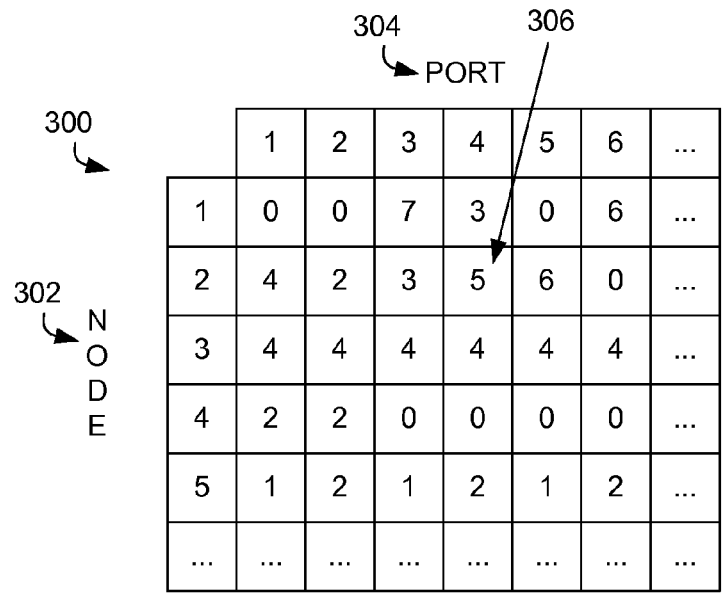
FIG. 3 depicts an example of a Target Issue Interval data structure.

FIG. 3 depicts an example of a Target Issue Interval data structure 300. A TII data structure may be maintained on each node. The TII data structure may be used to store the current TII value for every output port, and hence output queue, within the network device. In the example implementation shown in FIG. 3, the TII data structure is a table. The node axis 302 of the table may identify every possible node in the network device. The port axis 304 may identify every port on each identified node. Thus, the value stored at the intersection of a node and a port may be the TII currently in effect for that particular port on that particular node. For example, TII 306 may identify the TII for the fourth port on the second node as currently being the value 5. The various values of the TII will be described in further detail below.

The TII data structure may be maintained by the TII module 112. Whenever a response message, such as a response message 206 described above, is received, the TII value may be extracted from the response and the value added to the TII data structure. It should be understood that the TII data structure may be updated upon every response, regardless of the stream that sent the request that resulted in the response. As explained above, multiple streams on a source node may be sending data packets to a single output queue. As such, each stream will issue separate requests and receive separate responses. However, updating of the TII table is independent of the streams. Whenever a response message containing a TII is received, the TII data structure may be updated.

In addition, each node may periodically send a periodic update message 208 to all other nodes in the network device. As explained above, the periodic update message may contain the TII values for some or all output queues on a particular node. The TII module 112 may extract the TII values and update the TII data structure 300. In other words, in the example implementation depicted in FIG. 3, a portion of an entire row of the TII data structure may be updated upon receipt of a periodic update message. Through the use of the periodic update, a node may be made aware of the TII value for an output queue to which it is not currently sending packets (i.e. the TII value is made available even though no request/response messages related to that output queue are being sent). If the node later needs to begin sending a stream to such an output queue, the current value of the TII for that queue is available. Furthermore, the periodic update allows for the source node to maintain a current value for the TII of the output queue in between the updates provided by the response messages. The use of inter response TII updates will be described in further detail below.

FIG. 4 depicts an example of Target Issue Intervals (TII). As mentioned above, the TII determines the rate at which a stream may send request messages to an output queue. The TII may determine the rate at which a stream is expected to send data to an output queue. The TII may be represented as a delay normalized to a defined number of bytes, such that the amount of data offered by a stream remains approximately the same, regardless of the size of the data packets within the stream. This normalization allows for a bandwidth fair allocation of available bandwidth.

In some example implementations, the correspondence between the TII values and the delay may be determined at design time. In other example implementations, the correspondence may be configurable parameters that are set by a system administrator when configuring the network device. Although shown as a table, it should be understood that any other data structure may be used. Regardless of how the values are set or in what type of structure the values are stored, every node within the networking device may maintain the information regarding TII values.

For each TII value 410, there may be an associated per byte delay 420. As shown in FIG. 4, the per byte delay may be specified for a certain number of bytes, such as 64 bytes. For every 64 bytes of data in a packet for which a request was sent, the stream may delay the number of seconds specified before sending another request message. For example, if a stream has sent a request message for a 64 byte packet and the current TII interval for the output queue (as determined by a data structure such as the one depicted in FIG. 3) is set to a value, the stream will delay the determined number of seconds before sending a subsequent request message. Each TII value may be associated with an effective bandwidth 430. For example row 440 in FIG. 4 specifies that a TII value of 4 results in a 64 nanosecond (ns) delay before sending the next request message. If a stream is sending 64 byte packets, the stream will delay 64 ns between each subsequent request. In other words, the stream is offering data packets at a rate of 1 packet per 64 ns, which results in an effective bandwidth of 8 Gbit/sec.

In a case where larger data packets are being sent, the delay may be greater. For example, if a stream is sending data packets that are 2 Kilobytes (Kbyte) long, there will be a delay of 16,384 ns between request messages, given the same TII value of 4 described above. The reason for this is that a 2 Kbyte packet, when divided by 64 bytes, comes out to 32. Because the stream inserts a delay per 64 bytes, the stream will insert a delay of 32*64 ns=16,384 ns between requests. In other words, the stream is offering data packets at a rate of 1 packet per 16,384 ns, which again results in an effective bandwidth of 8 Gbit/sec.

The TII table may also maintain base TII values for each type of output queue. As mentioned above, output ports, and their corresponding output queues, may operate at various data rates. Some example output rates include 1 Gbit/sec, 10 Gbit/sec, and 100 Gbit/sec. The TII values determine the rate at which a stream may send request messages, and thus data, to an output queue. However, it may not be desirable to allow a stream to send data to an output queue at a rate that greatly exceeds that which can be supported for extended periods of time. For example, if an output queue is operating at 1 Gbit/sec, it may be desirable to limit the input to that queue to 2 Gbit/sec or less. Although a 2 Gbit/sec rate exceeds the capacity of the output queue, allowing such a rate for a period of time may allow for sufficient data to be added to the queue, thus ensuring the output queue is not starved for data. Although the techniques described herein are able to handle such an inrush of data without these limits, it may be desirable to address this case prior to it occurring.

For each data rate supported by an output queue, there may be specified a base TII value. As shown, base TII values have been specified for 1G 450, 10G 460, and 100G 470 ports. The system may limit an output queue to TII values that are at or above the base value. For example, an output queue operating at 10 Gbit/sec may be limited to TII values of 3 or above. As such, the output queue may only request data at a rate of 16 Gbit/sec or below. Such a restriction may be useful because it may be more efficient to restrict an output queue to a data rate close to that which it may actually have a chance of supporting. However, it should be understood that the techniques described herein are not dependent, and are capable of operating, without the base TII values.

The description of the operation of the TII values above assumes that the TII value remains constant throughout the delay period. However, in many cases this assumption may not be true. For example, a TII value may be selected and, based on the packet size, a delay may be initiated. However, the TII value for the output queue may change during the period of delay, thus causing the delay period to be too long or too short. For example, with a 2 Kbyte packet and a TII value of 4, the delay is 16,384 ns, which given the high speeds at which ports may operate, is a considerable amount of time. During the delay period, the TII value may change. If the delay is implemented as a single delay, there is no opportunity to adjust the period of delay. The techniques described herein overcome this problem by segmenting the delay into smaller portions that are responsive to the current TII value. Dividing the delay into smaller portions will be described in further detail below.

Figure 5:
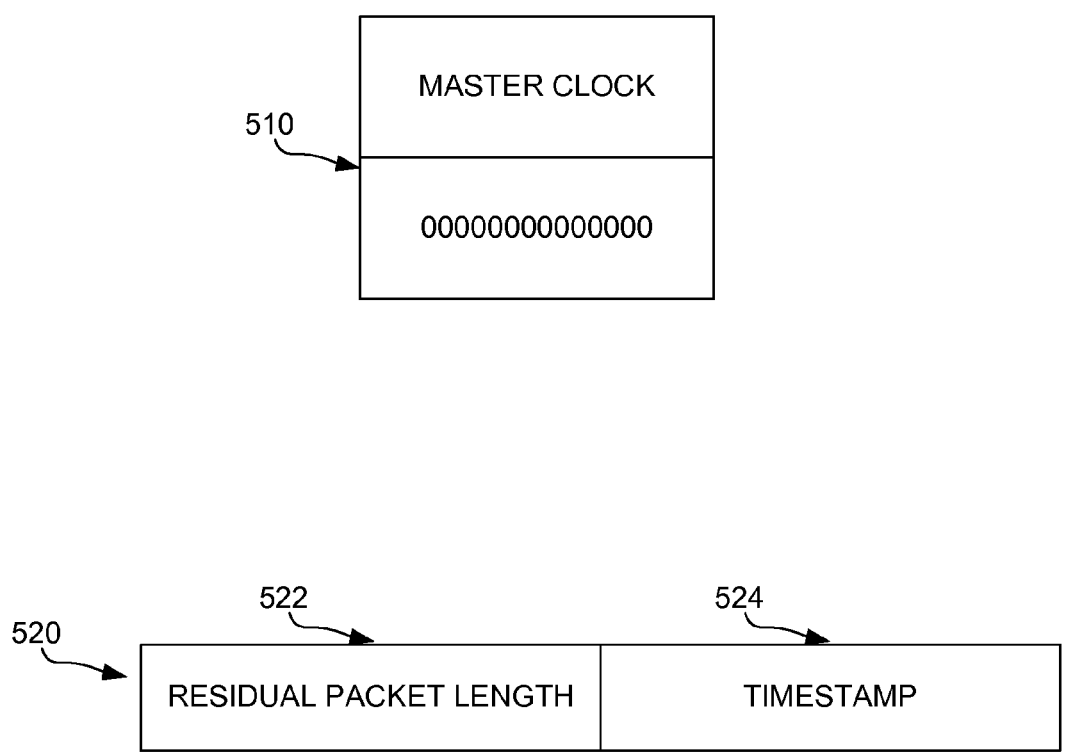
FIG. 5 depicts examples of data structures used to segment delays.

FIG. 5 depicts examples of data structures used to segment delays. A source node may maintain a master clock 510. The master clock may be used to maintain timing within the network device. In one example implementation, the master clock may be a counter. The counter may be incremented periodically. For example, the counter may be incremented every 1 ns. The counter may be used to maintain timestamps. The use of timestamps will be described in further detail below.

A request module may also maintain a stream descriptor 520 for each stream on a source node. The stream descriptor may be used when dividing the delay determined by the TII value into smaller segments that are responsive to changes in the TII value. The stream descriptor may include a residual packet length (RPL) field 522 that may be used to hold the residual length of a data packet. The stream descriptor may also contain a timestamp field 524. The timestamp field may indicate when the next action for the stream may occur. For example, the timestamp may indicate when the current TII value for the stream should be checked. When the master clock indicates a timestamp that equals or exceeds the timestamp, it may be time to check the current TII value for the output queue. Use of the stream descriptor will be described in further detail below.

Figure 6:
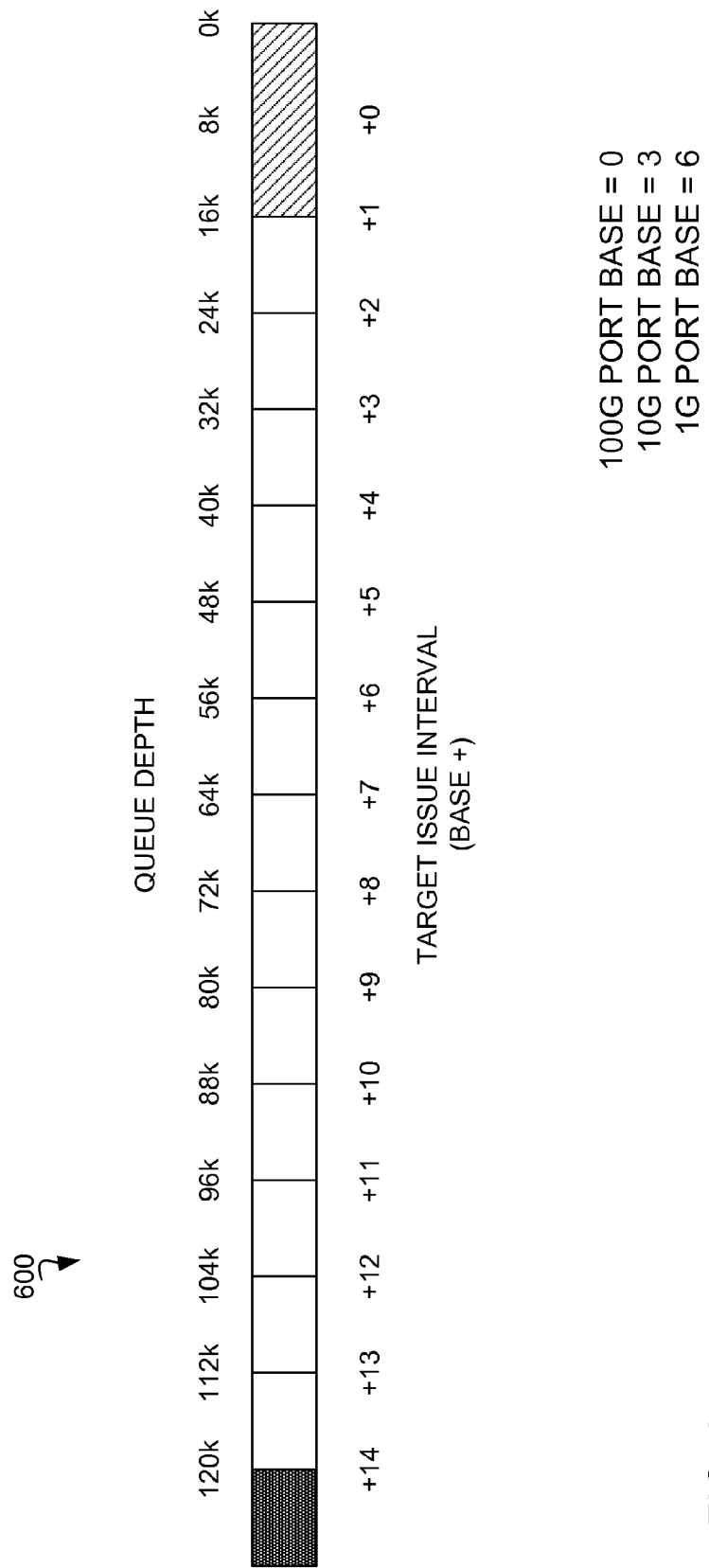
FIG. 6 depicts an example of an output queue.

FIG. 6 depicts an example of an output queue. As mentioned above, every output port on a destination node may be associated with an output queue 600. As packets are received by the destination node, the packets may eventually be placed in an output queue for transmission out of the networking device. The queue may be implemented as a first in first out (FIFO) queue. Although the output queue shown in FIG. 6 is depicted as a single, contiguous region of memory, it should be understood that this is only an example implementation. In other example implementations, the output queue may be distributed to non-contiguous regions of memory. For example, in some example implementations, the output queue may be implemented as a linked list, with the links maintaining the FIFO nature of the queue.

Regardless of implementation, at any given time, an output queue may have a depth. The depth of the output queue indicates how much of the available storage space within the queue is currently in use. The sizes of the data packets within the output queue are not important, but rather what should be noted is that the depth indicates the total amount of the queue that is currently in use. The output queue may be divided up into several segments. As shown, the output queue may be divided into segments of 8 Kbyte, however this particular segmentation is for purposes of description only. The actual determination of the segmentation may be a parameter that is configured by a system administrator when configuring the networking device.

Assigned to some of the segments may be Target Issue Interval values. In some implementations, the TII values are assigned as increments over the base rate for the output queue, as was described above. As shown, beginning with the segment beginning at a queue depth of 16 Kbyte, a TII value of +1 is assigned. Thus, at a queue depth of 16 Kbyte a TII value of the base rate +1 may be assigned to that transition point. Likewise, there may be transition points for TII values corresponding with each of the defined segments.

In operation, a queue may initially be empty, and thus have a depth of 0 Kbyte. As request messages are received and accepted, space equivalent to the identified size of a packet in the request message is allocated for the eventual receipt of the data packet. This allocated space is thus considered in use by the output queue because it will be used once the data packet arrives and is added to the queue. If request messages are accepted and space allocated at a rate faster than data packets within the queue can be transmitted from the output port and free up space within the queue, the queue depth will begin to grow. The reason for this is that more space within the queue is being allocated for receipt of data packets than space is being made available by data packets leaving the queue. Up to a certain point, such queue growth is not an issue, and may in fact be desirable as it ensures that the output queue may not be starved for data to be transmitted. As shown, up to the 16 Kbyte point, any growth in the output queue may be considered acceptable, and as such the input streams may not be limited in the amount of data that can be offered (to the extent that the base rate allows). However, at a certain point, it may be determined that the depth of the output queue is larger than desired to maintain a sufficient backlog of data to be output. Once a sufficient level of backlog has been achieved the rate of growth may be limited. For purposes of the remainder of the description of FIG. 6, it is assumed that the output port is a 100G port, and thus the base value is zero.

As shown, at the 16 Kbyte transition point, a TII value of one has been assigned. If the queue depth crosses this transition point, the TII value that may be sent in the response messages for this output queue may indicate that the TII value for the output queue is one. When a source node receives the value in the response message, the source node may update the current TII table to reflect the value of the TII. As the queue depth increases, additional transition points with a greater TII value may be crossed, and thus a higher value of a TII may be reported to the source node. Likewise, as the depth of the queue decreases, transition points with a lower TII value are crossed, and a correspondingly lower TII value may be reported. As mentioned above, and will be described in further detail below, the TII value determines the rate that streams are allowed to send data packets to the output queue.

As shown in FIG. 6, at some point the queue may reach a point where the depth can no longer increase. For example, an actual implementation of an output queue cannot have an infinite depth, as there cannot be an allocation of an infinite amount of memory for the queue. Thus, an output queue may be capped at a maximum depth, which may correspond to the maximum amount of memory that has been allocated for the output queue. As shown in FIG. 6, the output queue may have been limited to a maximum depth of 128 Kbyte. At a point just prior to this maximum depth, for example 120 Kbyte, the TII interval may be selected to be sufficiently high to allow for the output queue to drain. Should the output queue grow to a depth where additional request messages cannot be accepted because there is no space available in the output queue, the response message may indicate that the request is being refused and the data packet is not sent to the destination node. Use of the TII values is described in further detail below.

Figure 7A:
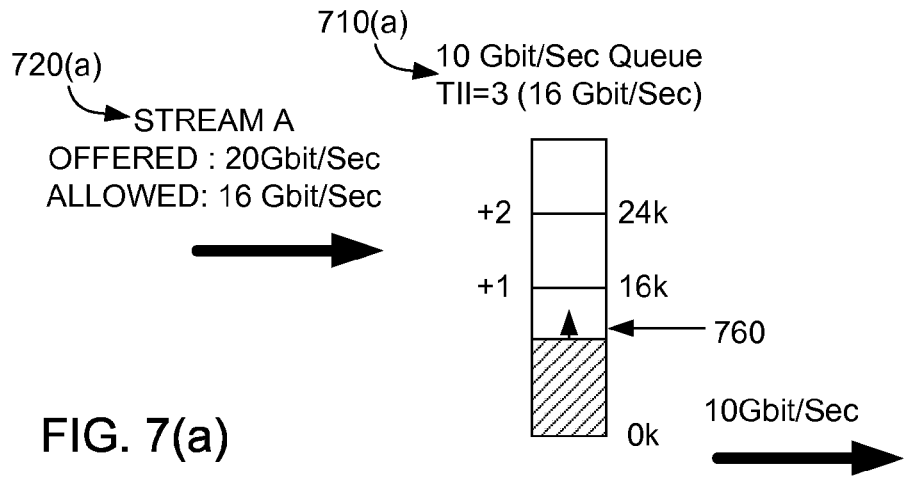
FIGS. 7(a-c) depict an example of output queue stabilization.

FIGS. 7(a-c) depict an example of output queue stabilization. Shown in FIG. 7(a) is a 10 Gbit/sec output queue 710(a). As described above, a 10 Gbit/sec output queue may initially limit the amount of traffic it may request to more closely conform with the output capabilities of its associated I/O port. As such, the TII for the output queue may be set to 3, which corresponds to an effective bandwidth of 16 Gbit/sec. Also shown is stream A 720(a) which has data to offer at a rate of 20 Gbit/sec. Because the initial TII is set to 3, the amount of traffic allowed will be limited to 16 Gbit/sec. Stream A may begin sending request messages to the output queue with an effective bandwidth of 16 Gbit/sec. Because the output queue 710 is a 10 Gbit/sec queue, the depth of the queue may begin to climb 760. The reason for this is that traffic may be coming into the queue at a rate of 16 Gbit/sec but can only leave the queue at a 10 Gbit/sec rate.

Figure 7B:
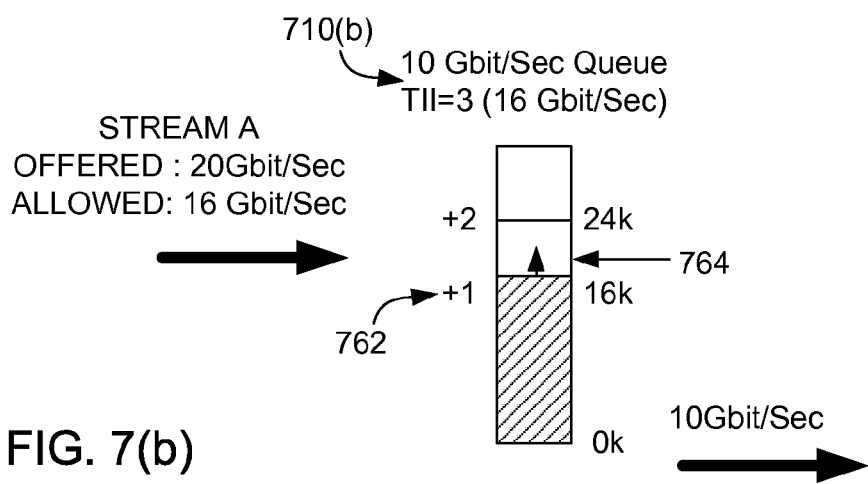
Figure 7C:
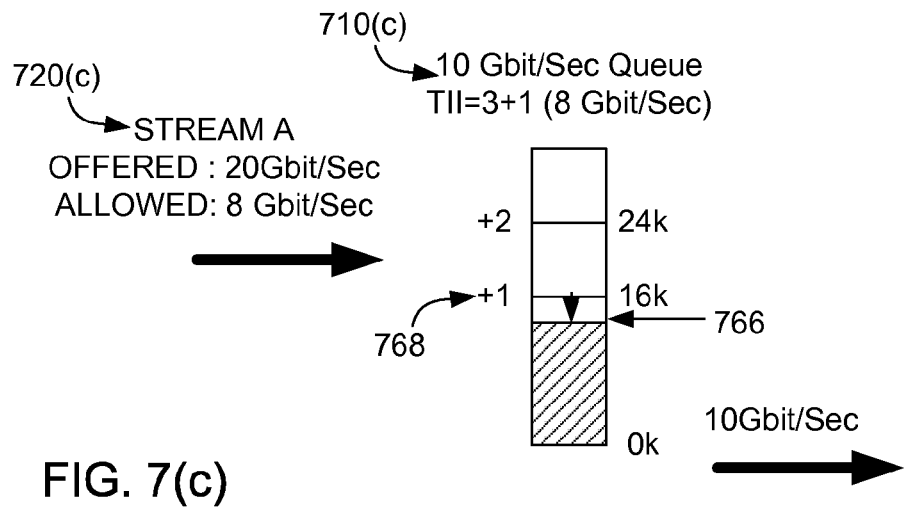

As the depth of the output queue continues to increase, at some point the depth will cross a boundary where the TII is changed. As shown in FIG. 7(b), at a queue depth 710(b) of 16 Kbyte, the TII is to be increased by one 762. However, due to the delay in communicating the TII back to stream A, the stream may continue to issue requests at the higher rate for a period of time, causing the queue to further increase in depth 764. As shown in FIG. 7(c), the new TII of 3+1 may be received by the sending node. Stream A 720(c) may then reduce the rate of request messages resulting in an allowed effective bandwidth of 8 Gbit/sec, which corresponds to a TII of value 4. As such, the output queue 710(c) may begin to decrease 766. The reason for this is that data may now be coming in at a rate of 8 Gbit/sec but is leaving the queue at a rate of 10 Gbit/sec.

At some point, the queue depth will again drop below a TII transition point. As shown, the depth of the output queue may eventually drop below the transition point at 16 Kbyte 768. As such, output queue may return to the initial TII value of 3 which may allow data at a rate of 16 Gbit/sec again. As such, the queue will begin to grow in depth again, as was shown in FIG. 7(a). The depth of the output queue will thus stabilize at around the 16 Kbyte point by dithering about that point. As such, the output queue has thus been stabilized.

Figure 8A:
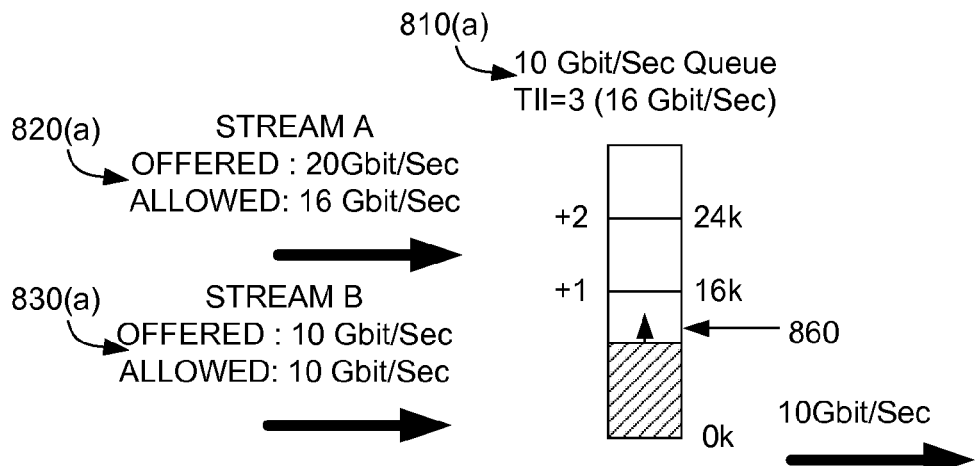
FIGS. 8(a-c) depict another example of output queue stabilization.

FIGS. 8(a-c) depict another example of output queue stabilization. FIG. 8 may be thought of as a continuation of FIG. 7, with the addition of a second stream. Just as above, output queue 810(a) may operate at 10 Gbit/sec, with an initial TII of 3, resulting in communication of an allowed bandwidth of 16 Gbit/Sec. Stream A 820(a) may again, be a 20 Gbit/sec stream, which is limited to 16 Gbit/sec by the TII of 3 currently in effect. Stream B 830(a) may be a 10 Gbit/sec stream. Because the current value of the TII allows traffic at a 16 G-bit/sec rate, and stream B is only offering 10 Gbit/sec of traffic, stream B is initially unrestricted. The queue depth of the output queue may begin to increase 860. The reason for this is that the combined rate of data coming into the output queue from both streams is 26 Gbit/sec, while the queue is draining at a rate of 10 Gbit/sec.

Figure 8B:
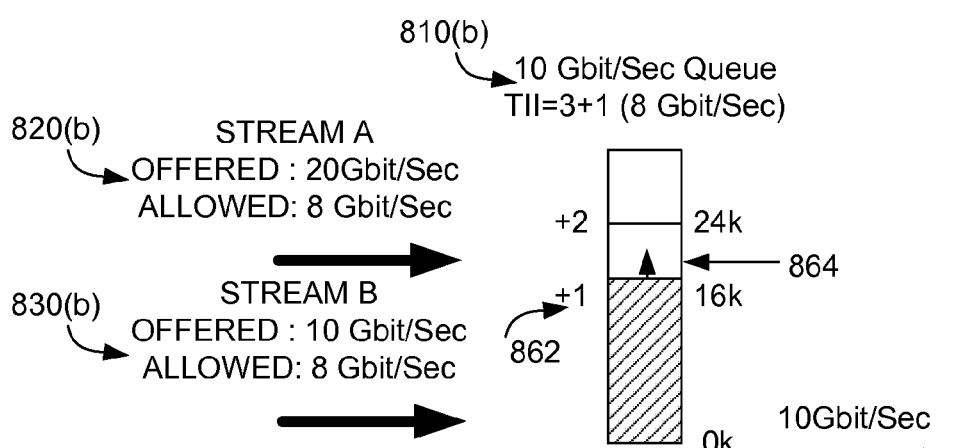

As the depth of the output queue continues to increase, at some point the depth will cross a boundary where the TII is changed. As shown in FIG. 8(b), at a queue depth 810(b) of 16 Kbyte, the TII is to be increased by one 862. The new TII may be communicated back to Stream A 820(b) and Stream B 830(b). As such, both of the streams may reduce the rate of traffic being sent to the output queue to 8 Gbit/sec from each stream, in accordance with a TII value of 4. However, even at the reduced rate, the combined traffic is still 16 Gbit/sec, which is greater than the 10 Gbit/sec output rate of the output queue 810(b). As such, the depth of the queue may continue to rise 864, albeit at a slower rate than before.

Figure 8C:
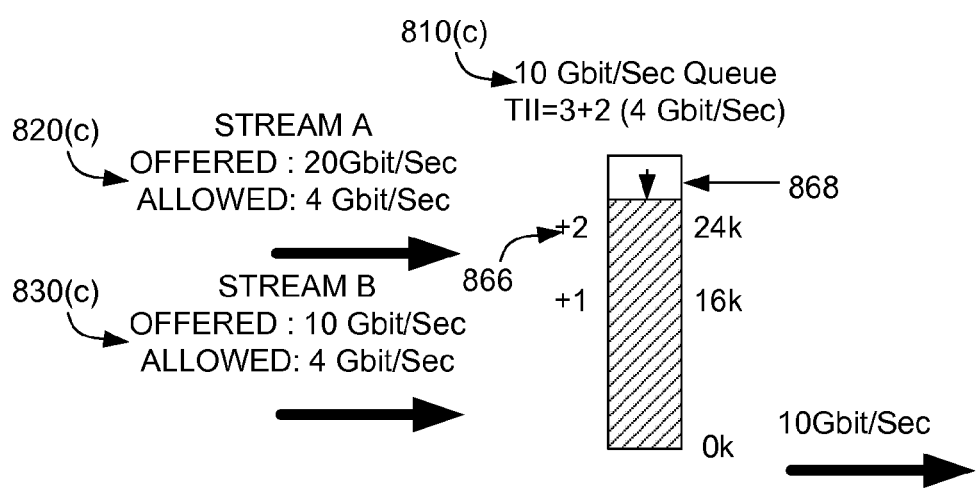

As the depth of the output queue continues to increase, at some point the depth will cross the next boundary where the is changed. As shown in FIG. 8(c), at a queue depth of 24 Kbyte, the TII value is two 866. Thus, a value of two may be added to the base value, resulting in a value of 5. Output queue 810(c) may then communicate the new TII value of 5, which corresponds to a data rate of 4 Gbit/sec to Stream. A 820(c) and Stream B 830(c). Those streams may then reduce the rate at which data is sent to 4 Gbit/sec each, resulting in a combined rate of traffic of 8 Gbit/sec. Because the output queue 810(c) is draining at a rate of 10 Gbit/sec and the traffic is coming in at a rate of 8 Gbit/sec, the depth of the output queue will begin to drop 868. Just as above, the queue depth will continue to drop until the transition point 866 at 24 Kbyte is passed. The TII may then be reduced to again allow traffic at the 8 Gbit/sec rate, which was described in FIG. 8(b). The depth of the output queue will thus stabilize at around the 24 Kbyte point by dithering about that point. As such, the output queue has thus been stabilized.

Although only two streams are shown in FIG. 8, the techniques described herein are applicable regardless of the number of streams. The TII value may be determined based on the depth of the output queue, regardless of how many streams are sending data packets. If additional streams were to begin sending data packets to the output queue, the depth would again begin to increase, resulting in a higher TII value and hence further limiting the rate at which each stream may send data. Likewise, if a stream discontinues sending data to the output queue, the queue depth may begin to decrease, resulting in a lower TII value, which in turn will allow the remaining streams to send data at a higher rate.

FIG. 9 depicts an example flow with a constant Target Issue Interval. In the preceding description, it has generally been assumed that a stream will conform the rate at which data packets are offered to the rate determined by the Target Issue Interval for the output queue that is to receive the data packets. FIG. 9 describes how the techniques described herein are usable to conform the data rate offered by a stream to that which is specified by the Target Issue Interval given a constant TII value.

Figure 9A:
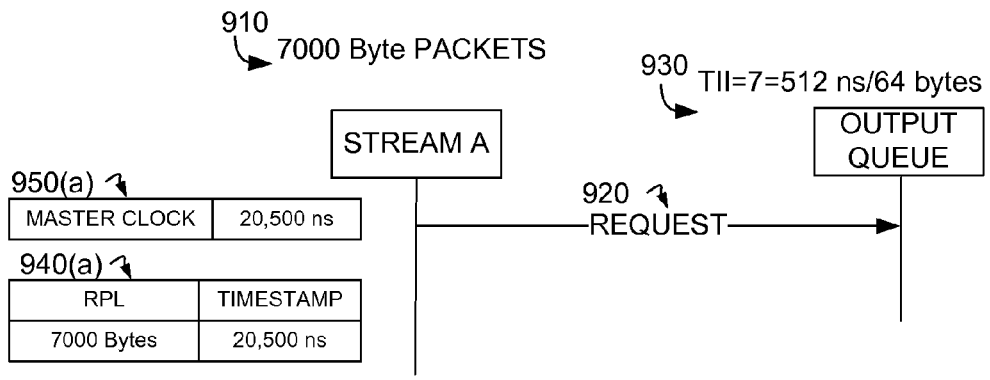
FIGS. 9(a-e) depict an example flow with a constant Target Issue Interval.

In FIG. 9(a), stream A 910 may be a stream of packets that are each 7000 bytes long. It should be understood that the length of the packets in a stream does not need to be constant and the techniques described herein are applicable to streams with different size packets. However, for ease of description, stream A is described as a stream of constant sized packets. Stream A may send a request message 920 to an output queue 930. The request message may notify the output queue that a data packet of 7000 bytes will eventually be arriving in the output queue. For purposes of description, assume the output queue is currently operating with a TII of 7, and that value is stored in the TII table described with respect to FIG. 4.

As mentioned above, each stream may have a stream descriptor 940(a). Also as mentioned above, each node may maintain a master clock 950(a). When stream A sends the request message 920, the current value of the master clock may be stored in the timestamp field of the stream descriptor. Also stored may be the residual packet length (RPL), which immediately after sending a request message may equal the size of the data packet included in the request message. As shown, the current RPL is 7000 bytes and the timestamp is 20,500 ns.

Figure 9B:
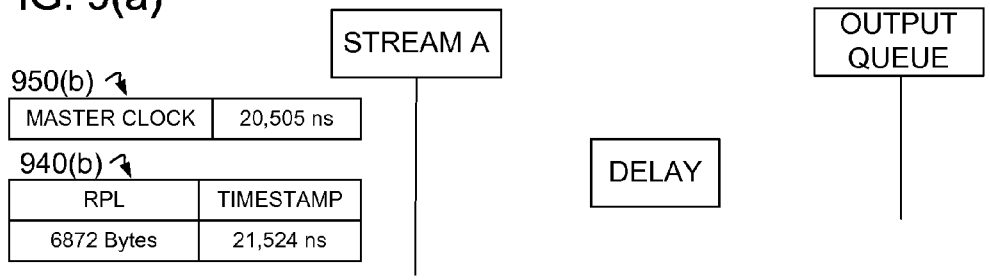

Shortly after sending the request message, stream A may begin a delay for a period of time. The period of time may be determined based on a portion of the size of the data packet referenced in the request message. A fixed time period, such as 1024 ns may be defined. A calculation may be performed to determine the number of bytes that would result in a delay of the fixed time period, given a TII. As shown in FIG. 9(b), the delay may be determined by computing the number of bytes that would result in a delay of 1024 ns using the current TII of 7. A TII of 7 is associated with a request rate of 64 Bytes/512 ns. Multiplying the fixed time period of 1024 ns by the request rate of 64 Bytes/512 ns produces a result of 128 Bytes. Stream A may subtract a portion of the size of the data packet from the RPL. As shown, the computed number of bytes, in this case, 128 bytes, may be subtracted from the residual packet length and the new value stored in the RIM field of the stream descriptor 940(b). Stream A may also increment the timestamp by adding the fixed time period to the current value contained in the time stamp field 950(b). As shown, the RPL is 6872 bytes and the timestamp is 21,524 ns. Stream A may then initiate a delay until the value of the master clock is equal or greater than the value of the time stamp.

Figure 9C:
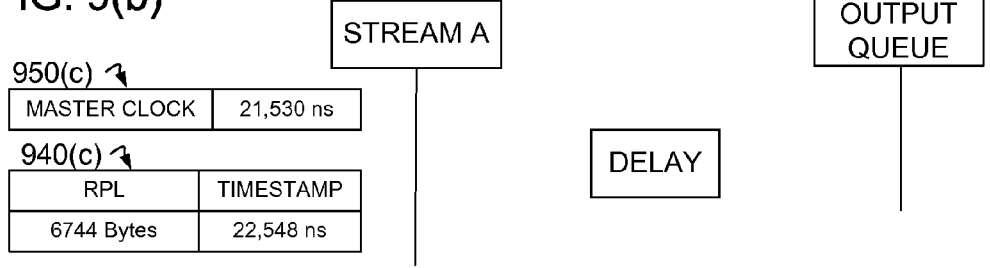

FIG. 9(c) depicts the process once the value of the master clock 950(c) equals or exceeds the value of the timestamp. Stream A may generally repeat the process described with respect to FIG. 9(b). Using the current TII value of 7, which is assumed in FIG. 9 to be constant, the number of bytes that can be requested in a fixed time period is calculated. Just as above, for a TII of 7, 128 bytes may be requested in a 1024 ns period. Stream A may subtract this number of bytes from the RPL field of the stream descriptor 940(c). Stream A may also increment the timestamp by the fixed time period. As shown, the new RPL is 6744 bytes and the new time stamp is 22,548 bytes.

It should be noted that the fixed time period is added to the timestamp, rather than adding it to the current master clock and storing that value in the timestamp field. The reason for this may be that it cannot be guaranteed that a node will be able to complete the processing described herein at exactly the specified timestamp. By adding time periods to the timestamp directly, any minor discrepancy between when the master clock arrives at a particular value and when the described processing occurs, is not cumulative. Thus, regardless of the number of times the cycle described herein repeats, the discrepancy between the master clock and the time stamp is limited. For purposes of the remainder of this description and for FIG. 10, it will be assumed that the processing occurs immediately upon the timestamp equaling the master clock value, however it should be understood that this is not required.

Figure 9D:
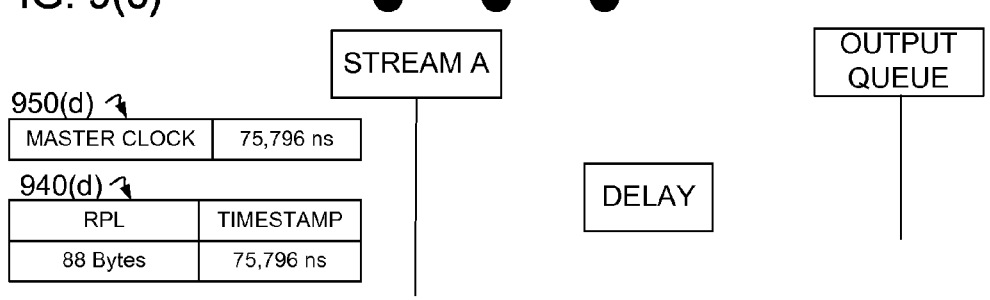
Figure 9E:
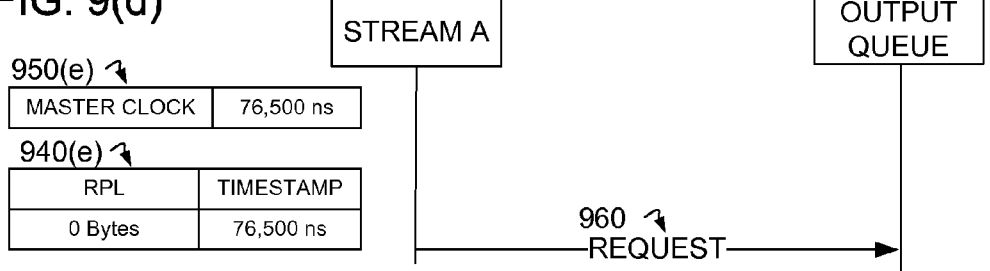

The process described with respect to FIG. 9(c) may continue until the RPL is less than the number of bytes that may be requested in the fixed time period using the current TII value. As shown in FIG. 9(d), the RPL of the stream descriptor 940(d) is 88 bytes. Given that the number of bytes that may be requested in a 1024 ns period is 128 bytes with a TII of 7, subtracting 128 bytes would result in a negative value. At this point, instead of calculating the number of bytes that may be requested in a fixed time period, the amount of time required to request the number of bytes specified by the RPL using the current TII is determined. As shown, the RPL is 88 bytes. A TII of 7 implies a request rate of 512 ns/64 bytes. Thus, the resulting delay period is 704 ns. This value may then be added to the timestamp 940(e), as is shown in FIG. 9(e). Also as shown in FIG. 9(e), the RPL value may be set to zero, because the delay for the entire 7000 byte packet has now been accounted for.

As shown in FIG. 9(e), the master clock 950(e) may eventually arrive at the timestamp stored in the stream descriptor 940(e). At this point, because the RPL is now zero, Stream A may issue a new request message 960. As shown in FIG. 9, the master clock at the time of sending the initial request message was 20,500 ns and the master clock at the time of sending the next request message was 76,500 ns. The resulting delay is thus 56,000 ns for a 7000 byte packet. In other words, 56,000 ns/7000 bytes, which when normalized to 64 bytes comes out to 512 ns/64 bytes, which is the request rate specified for a TII value of 7. Furthermore, sending requests for 7000 byte packets with a delay of 56,000 ns between requests, results in a data rate of 1 Gbit/sec, which is the data rate expected for a TII value of 7. Thus, breaking up the overall delay of 56,000 ns into smaller pieces results in the same overall delay, and hence request rate, as implementing the delay in one piece.

FIGS. 10(a-e) depict an example flow with a decreasing Target Issue Interval. In FIG. 9 above, it was assumed that the TII remained constant between setting the timestamps. However, this may not always be the case. For example, an output queue as depicted in FIG. 8 may request a TII based on the depth of the output queue. If a stream that is supplying the data should drop out, more bandwidth may be made available for the remaining streams. Thus, as shown in FIG. 8 if Stream B were to drop out, Stream A may be allowed to send request messages at a faster rate because the output queue may decrease the TII value. However, if a delay is implemented as a single delay, the new value of the TII cannot go into effect until the single delay has completed. By breaking up the delay into smaller pieces, updates to the TII value may be acted upon soon after they are received.

FIG. 10 depicts the same flow as FIG. 9, with a change in the TII value during one of the delay periods. In FIG. 10(a) a request message 1020 is sent from Stream A 1010 to output queue 1030. Just as above, the current value of the master clock 1050(a) and the length of the packet are stored in the stream descriptor 1040(a). As shown, the RPL is 7000 bytes and the timestamp is 20,500 ns. In FIG. 10(b), just as above, the RPL is determined by subtracting the number of bytes determined using the current TII value of 7 and a fixed time period. Again this value is 128 bytes for a TII of seven and a fixed time period of 1024 ns. Thus, 128 bytes is subtracted from the RPL and 1024 ns is added to the timestamp as is shown in the stream descriptor 1040(b).

Figure 10A:
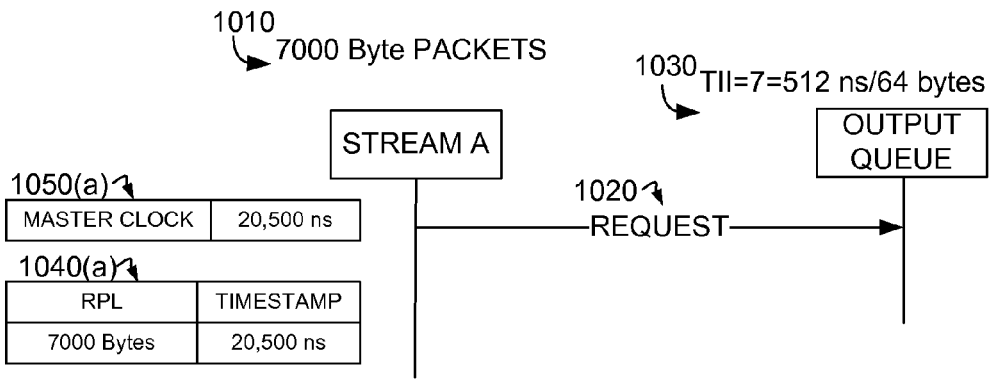
FIGS. 10(a-e) depict an example flow with a decreasing Target Issue Interval.
Figure 10B:
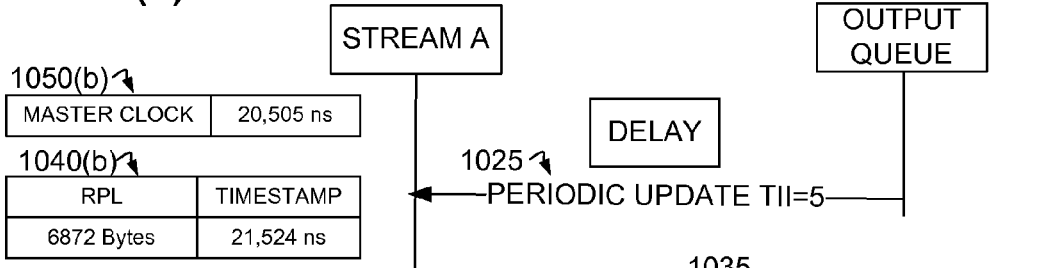

Sometime during the delay depicted in FIG. 10(b), a new TII value may be received from the output queue. For example, a new TII value may be received in a periodic update message 1025. Alternatively, as mentioned above, a node may have multiple streams sending request messages to the same output queue. A response message from a stream other than stream A may have been received. In either case, the TII table may be updated with the new TII value for the output queue. For purposes of this description, the new TII value may be 5.

Figure 10C:
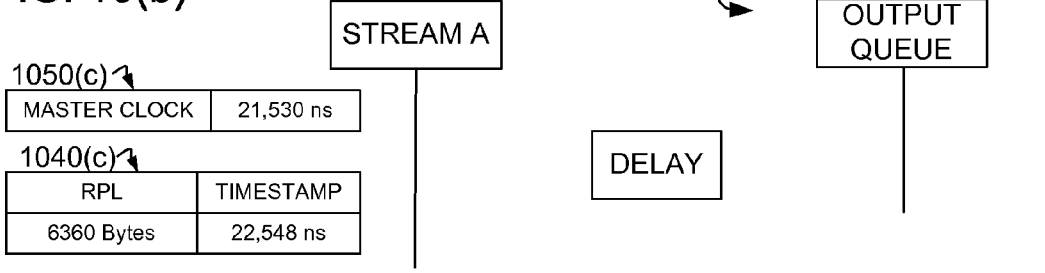

In FIG. 10(c), the same process described with respect to FIG. 10(b) may occur, however this time with the current TII value of 5. The current value of the TII may be retrieved from the TII table, thus ensuring that the stream is using the most current value for the TII. Given a fixed time period of 1024 ns and a TII value of 5 which implies a data request rate of 64 bytes/128 ns, the calculated number of bytes is 512. Thus, 512 bytes may be subtracted from the RPL value, and the new value stored in the RPL field. Just as above, the timestamp may be incremented by 1024 ns to reflect the end of the delay period. As shown, the stream descriptor 1040(c) may be updated to indicate an RPL of 6360 bytes (6872 bytes from FIG. 10(b)—512 bytes determined above) and the time stamp may be incremented by 1024 ns.

Figure 10D:
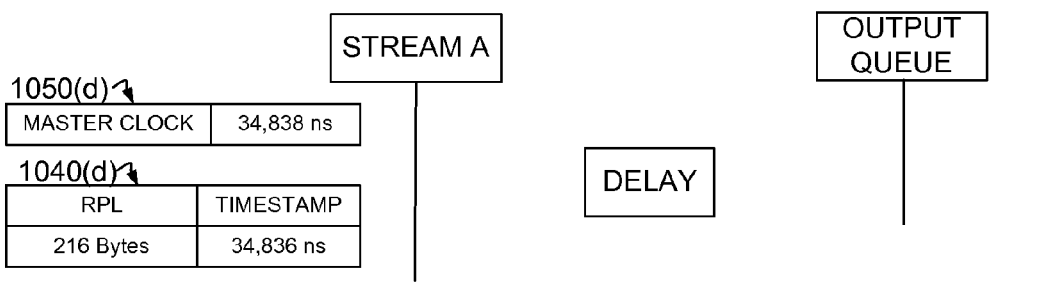

The process described in FIG. 10(d) may then repeat until the RPL is less than the number of bytes that may be requested in the defined time period. As shown, the RPL in the stream descriptor 1040(d) may eventually indicate 216 bytes remain. Subtracting 512 bytes from 216 bytes would result in a negative number. As such, the RPL is set to zero as shown in the stream descriptor 1040(e). The time required to request the number of bytes that remain in the RPL, in this case 216 bytes, may be computed based on the current TII. In this case, 216 bytes with a TII of 5 results in a delay of 432 ns. The computed value may then be added to the timestamp as shown in the stream descriptor 1040(e).

Figure 10E:
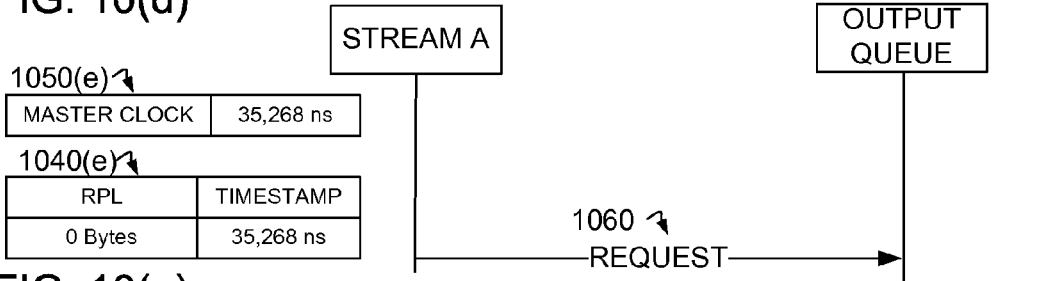

In FIG. 10(e), the master clock 1050(e) may now equal the value of the timestamp in the stream descriptor 1040(e). Because the residual packet length is zero, Stream A may send a new request message 1060. As shown in FIG. 10, the master clock at the time of sending the initial request message was 20,500 ns and the master clock at the time of sending the next request message was 35,268 ns, resulting in an overall delay of 14,768 ns for a 7000 byte packet using the most current TII value for each delay period. Had the delay been implemented as a single delay, the length of the delay would have been 56,000 ns, as determined by the initial TII of 7. Because there would have been no opportunity to adjust a single delay based on changes to the TII value absent the techniques described herein, the full delay would have been unavoidable. Thus, the techniques described herein may reduce the chances of the output queue running out of data while the full delay of 56,000 ns elapses. By dividing the delay period into smaller pieces and computing the delay for each piece using the most current TII value, a stream is able to respond to changes in the TII value much more rapidly. Although FIG. 10 was described with respect to a decreased TII value, it should be understood that the techniques are applicable to an increased TII value as well. Furthermore, the techniques are not limited to a TII value that either increase or decreases. The TII value may increase/decrease for one piece of the delay, and then move in the opposite direction for a different piece of the delay.

Figure 11:
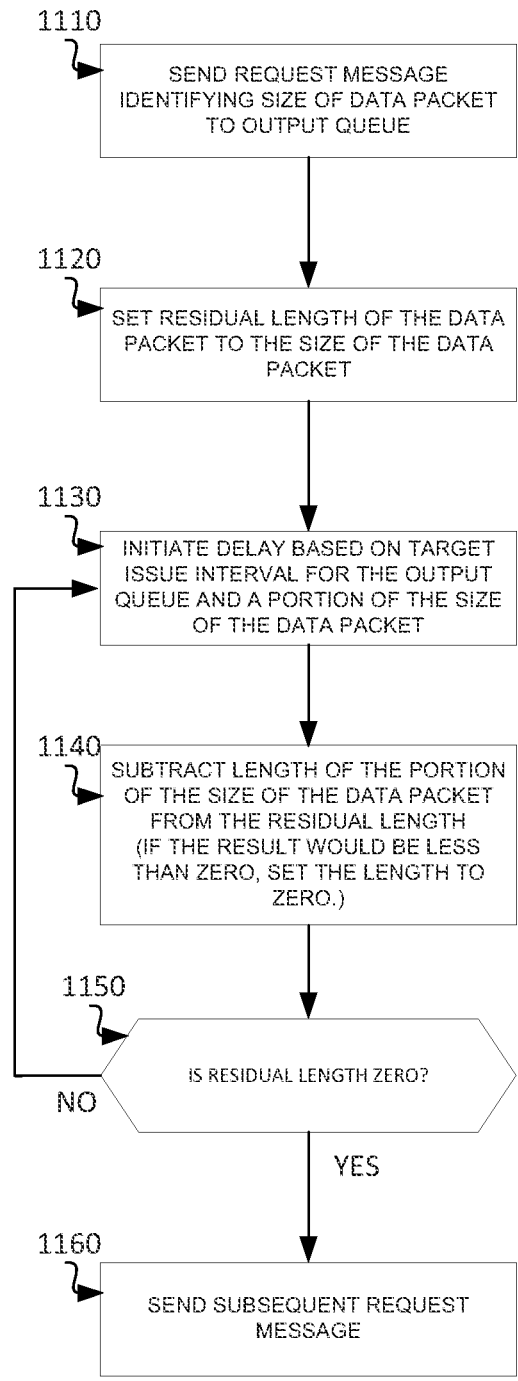
FIG. 11 is an example of a high level flow diagram for a stream.

FIG. 11 is an example of a high level flow diagram for a stream. In block 1110 a request message identifying the size of a data packet may be sent to an output queue. For example, the request message may be sent from a source node to an output queue on a destination node. In block 1120 a residual length of the data packet may be set to the size of the data packet. As described, immediately after sending a request message, the residual length may be set to equal the size of the requested data packet. In block 1130 a delay may be initiated. The delay may be based on the Target Issue Interval for the output queue and a portion of the size of the data packet. For example, the portion of the size of the data packet may be determined based on the number of bytes that may be requested in a fixed period of time. Once the residual length has decreased to the point where subtracting the number of bytes that may be requested in a fixed period of time results in a negative number, the portion may be determined by the residual length itself. In block 1140 the length of the portion of the size of the data packet may be subtracted from the residual length. In block 1150 it may be determined if the residual length is zero. If not, the process moves to block 1130. If so, the process moves to block 1160 wherein a subsequent request message may be sent.

Figure 12:
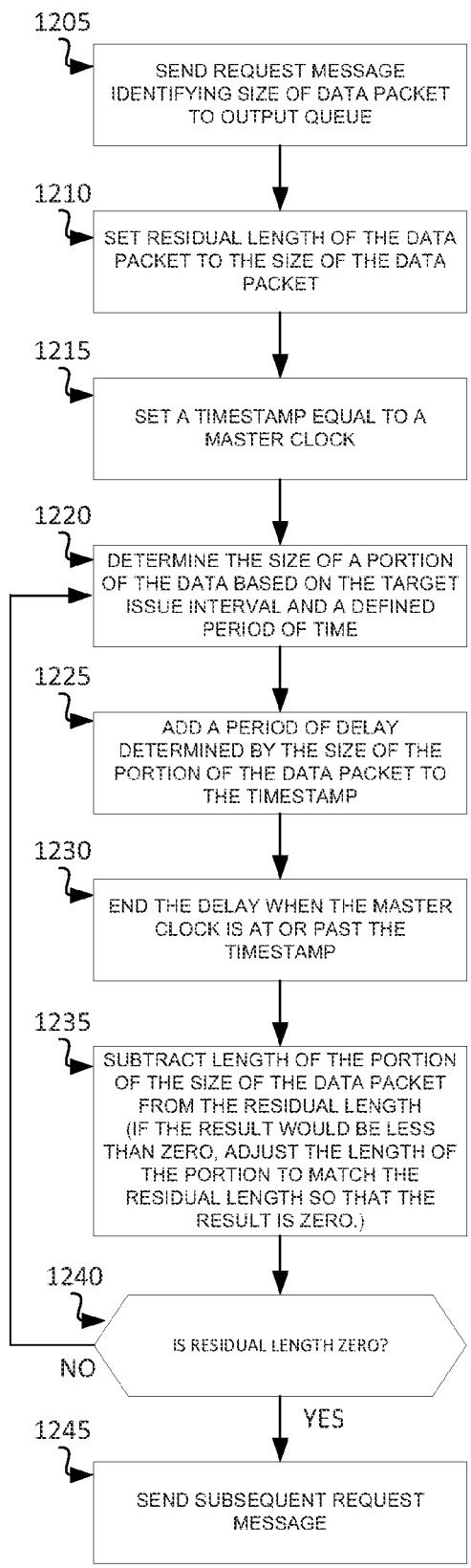
FIG. 12 is an example of a high level flow diagram for a stream using timestamps.

FIG. 12 is an example of a high level flow diagram for a stream using timestamps. In block 1205 a request message identifying the size of a data packet may be sent to an output queue. For example, the request message may be sent from a source node to an output queue on a destination node. In block 1215 a timestamp may be set equal to a master clock. In block 1220 a size of a portion of the data may be determined based on the Target Issue Interval and a defined period of time, as was described above.

In block 1225 a period of delay determined by the size of the portion of the data packet may be added to the timestamp. In block 1230 the delay may end when the master clock is at or past the timestamp. In block 1235 the length of the portion of the size of the data packet may be subtracted from the residual length. In block 1240 it may be determined if the residual length is zero. If not, the process moves to block 1220. If so, the process moves to block 1245 wherein a subsequent request message may be sent.

Figure 13:
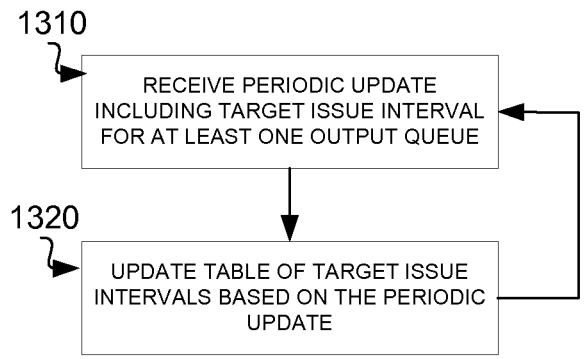
FIG. 13 is an example of a high level flow diagram for receiving periodic updates.

FIG. 13 is an example of a high level flow diagram for receiving periodic updates. In block 1310 a periodic update including a target issue interval for at least one output queue may be received. For example, a periodic update message sent from a destination node may be received by a source node. The message may include the TII value for at least one output queue on the destination node. In block 1320 a table of target issue intervals may be updated based on the periodic update. In other words, the target issue interval table on a source node that maintains the TII values for all output queues may be updated based on the output queues included in the periodic update.

Figure 14:
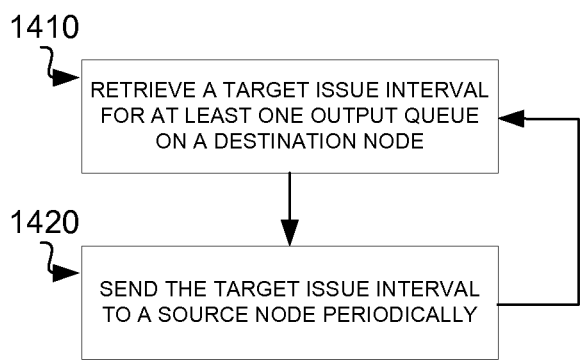
FIG. 14 is an example of a high level flow diagram for sending periodic updates.

FIG. 14 is an example of a high level flow diagram for sending periodic updates. In block 1410 a target issue interval for at least one output queue on a destination node may be retrieved. For example, the TII value may be retrieved from a queue module on a destination node. In block 1420 the TII may be sent to a source node periodically.

I claim:

1. A method comprising:
sending, from a source node, a request message identifying a size of a data packet, to an output queue;
setting a residual length of the data packet to the size of the data packet;
while the residual length of the data packet is greater than zero, iterating the following pair of steps:
initiating a delay based on a Target Issue Interval for the output queue and a portion of the size of the data packet; and
reducing the residual length by a length of the portion of the size of the data packet; and
sending a subsequent request message once the residual length of the data packet is zero.

2. The method of claim 1 further comprising:
determining the size of the portion of the data packet based on the Target issue Interval and a defined period of time.

3. The method of claim 2 wherein the defined period of time is 1.024 microseconds and the size of the portion of the data packet is determined based on the number of bytes that would result in a delay of 1.024 microseconds using the Target issue Interval.

4. The method of claim 2 wherein if the residual length of the data packet is less than the size of the portion of the data packet, the size of the portion of the data packet is set to the residual length of the data packet.

5. The method of claim 4 further comprising:
setting a timestamp equal to a master clock timestamp when the request message is sent.

6. The method of claim 5 wherein initiating the delay further comprises:
adding a period of delay determined by the size of the portion of the data packet to the timestamp; and
ending the delay when the master clock timestamp is at or past the timestamp.

7. The method of claim 6 further comprising:
receiving a periodic update including the Target Issue Interval for at least one output queue; and
updating a table of Target Issue Intervals based on the periodic update, wherein the Target Issue Interval for the output queue is determined based on the table.

8. The method of claim 7 wherein the periodic update includes Target Issue Intervals for all output queues on a destination node.

9. A device comprising:
ports; and
a node chip coupled to the ports, the node chip including processors, logic, and memory configured to define,
a Target Issue interval module to maintain Target Issue Intervals for a plurality of output queues; and
a request module to send a request message identifying a size of a data packet to an output queue and to implement a delay based on a portion of the size of the data packet, a first Target Issue Interval for the output queue received before the delay is initiated and a second Target Issue Interval received after the delay is initiated.

10. The device of claim 9 further comprising:
the Target Issue Interval module to receive a periodic update including the Target Issue Interval for at least one output queue from a destination node and to update the maintained Target Issue intervals based on the periodic update, the second Target Issue Interval resulting from updating the first Target Issue Interval.

11. The device of claim 10 further comprising:
a response module to send the periodic update including the Target Issue Intervals to a source node.

12. The device of claim 10 further comprising:
a queue module to maintain the Target Issue interval for each output queue on the destination node, wherein the periodic update includes the Target issue Intervals from the queue module.

13. A method comprising:
retrieving a Target Issue Interval for at least one output queue on a destination node; and
sending the Target Issue Interval for the at least one output queue to a source node periodically in a periodic update message, wherein the source node stores the Target Issue Interval for the at least one output queue.

14. The method of claim 13 wherein the period is 5 microseconds.

15. The method of claim 13 wherein the periodic update message includes Target Issue Intervals for all output queues on the destination node.

16. A method comprising:
sending, from a source node to a destination node, a first request message identifying a first data packet to be sent from the source node to the destination node for output from a first output port of the destination node, said request message specifying a size of the first data packet;
receiving, by the source node from the destination node, a response message identifying the packet and specifying a first target issue interval (TII) before the expiration of which a second request message identifying a second packet to be sent from the source node to the destination node for output of the first output port of the destination node is not to be sent;
determining a first delay interval based at least in part on the first TII;
prior to sending the second request message, receiving, by the source node from the destination node, a second TII;

determining a second delay interval corresponding to the second TII; and upon or after expiration of the second interval, sending the second request message.

17. A device comprising:

ports; and a node chip coupled to the ports to manage communication of data packets therebetween, the node chip including processors, logic, and memory configured to implement a method including, sending, from a source node to a destination node, a first request message identifying a first data packet to be sent from the source node to the destination node for output from a first output port of the destination node, receiving, by the source node from the destination node, a response message identifying the first data packet and specifying a first target issue interval (TII) before the expiration of which a second request message is not to be sent, determining a first delay interval corresponding to the first TII, prior to sending the second request message, receiving, by the source node from the destination node, a second TII, determining a second delay interval corresponding to the second TII, and upon or after expiration of the second delay interval, sending the second request message, the second request message identifying a second data packet to be sent from the source node to the destination node for output from the first output port of the destination node.

* * * * *

UNITED STATES PATENT AND TRADEMARK OFFICE
CERTIFICATE OF CORRECTION

PATENT NO.        : 8,879,571 B2
APPLICATION NO.   : 13/286878
DATED             : November 4, 2014
INVENTOR(S)       : Michael L. Ziegler It is certified that error appears in the above-identified patent and that said Letters Patent is hereby corrected as shown below:

In the Claims

In column 15, line 34, in Claim 1, delete "node," and insert -- node to a destination node, --, therefor.

In column 15, line 35, in Claim 1, delete "packet, to an output queue;" and insert -- packet; --, therefor.

In column 15, line 42, in Claim 1, delete "packet;" and insert -- packet, wherein the Target Issue Interval may be updated during the iterating; --, therefor.

In column 15, line 49, in Claim 2, delete "issue" and insert -- Issue --, therefor.

In column 15, line 54, in Claim 3, delete "issue" and insert -- Issue --, therefor.

In column 15, line 59, in Claim 5, delete "comprising;" and insert -- comprising: --, therefor.

In column 16, line 15, in Claim 9, delete "interval" and insert -- Interval --, therefor.

In column 16, line 19, in Claim 9, delete "delay based on" and insert -- delay specifying when to send a subsequent request message wherein the delay is implemented based on, --, therefor.

In column 16, lines 21-22, in Claim 9, delete "initiated and a second" and insert -- initiated, and an updated --, therefor.

In column 16, line 28, in Claim 10, delete "intervals" and insert -- Intervals --, therefor.

In column 16, line 35, in Claim 12, delete "interval" and insert -- Interval --, therefor.

In column 16, line 37, in Claim 12, delete "issue" and insert -- Issue --, therefor.

In column 16, lines 40-45, in Claim 13, delete "retrieving a Target Issue Interval for at least one output Signed and Sealed this
Fourteenth Day of April, 2015

Michelle K. Lee
*Director of the United States Patent and Trademark Office*

CERTIFICATE OF CORRECTION (continued)

U.S. Pat. No. 8,879,571 B2 queue on a destination node; and sending the Target Issue Interval for the at least one output queue to a source node periodically in a periodic update message, wherein the source node stores the Target Issue Interval for the at least one output queue." and insert -- receiving, by a destination node from a source node, a first request message specifying a packet size of a data packet to be sent from the source node to an output queue of said destination node; sending, from a response Target Issue Interval for the output queue, the response Target Issue Intervals being based at least in part on said packet size; and periodically sending, from the destination node to the source node, periodic update messages specifying respective updated Target Issue Intervals for the output queue, wherein the source node stores the updated Target Issue Intervals for the at least one output queue. --, therefor.

In column 16, line 49, in Claim 15, delete "message includes" and insert -- messages include --, therefor.

In column 16, line 58, in Claim 16, delete "the" and insert -- the first data --, therefor.

In column 17, line 3, in Claim 16, delete "second" and insert -- second delay --, therefor.